Oct. 25, 1960 B. F. ALMOND 2,957,195
AUTOMOBILE WHEEL WASHER

Filed Feb. 15, 1954 5 Sheets—Sheet 1

INVENTOR.
BURTON F. ALMOND
BY
Lyon & Lyon
ATTORNEYS

Oct. 25, 1960  B. F. ALMOND  2,957,195
AUTOMOBILE WHEEL WASHER
Filed Feb. 15, 1954 5 Sheets-Sheet 2

INVENTOR.
BURTON F. ALMOND
BY
ATTORNEYS

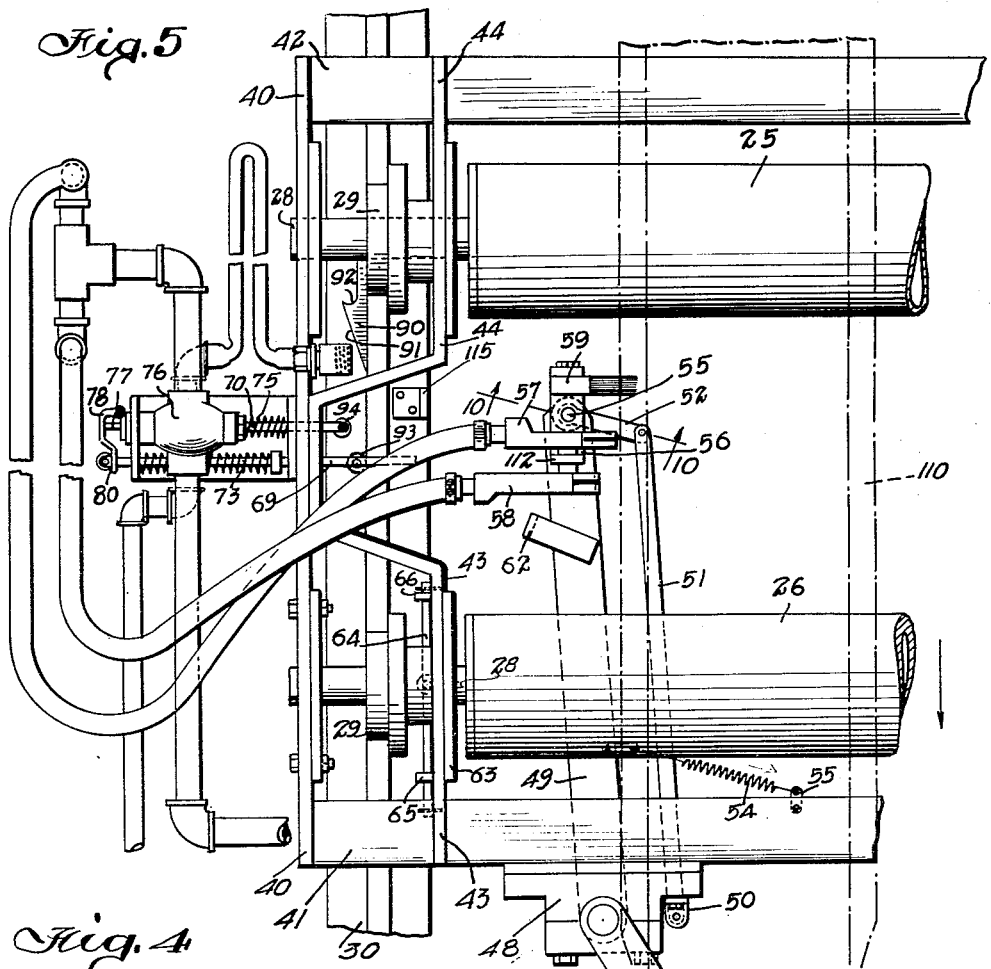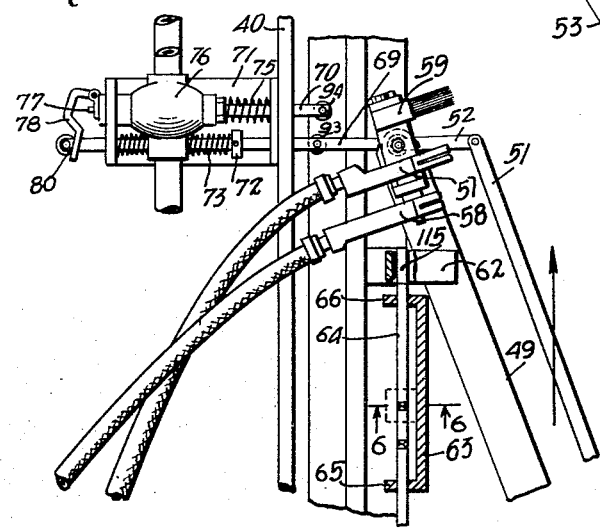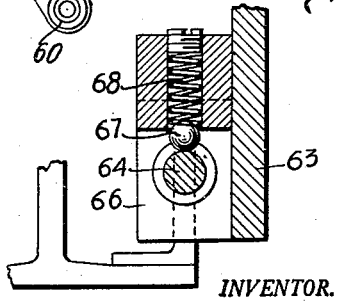

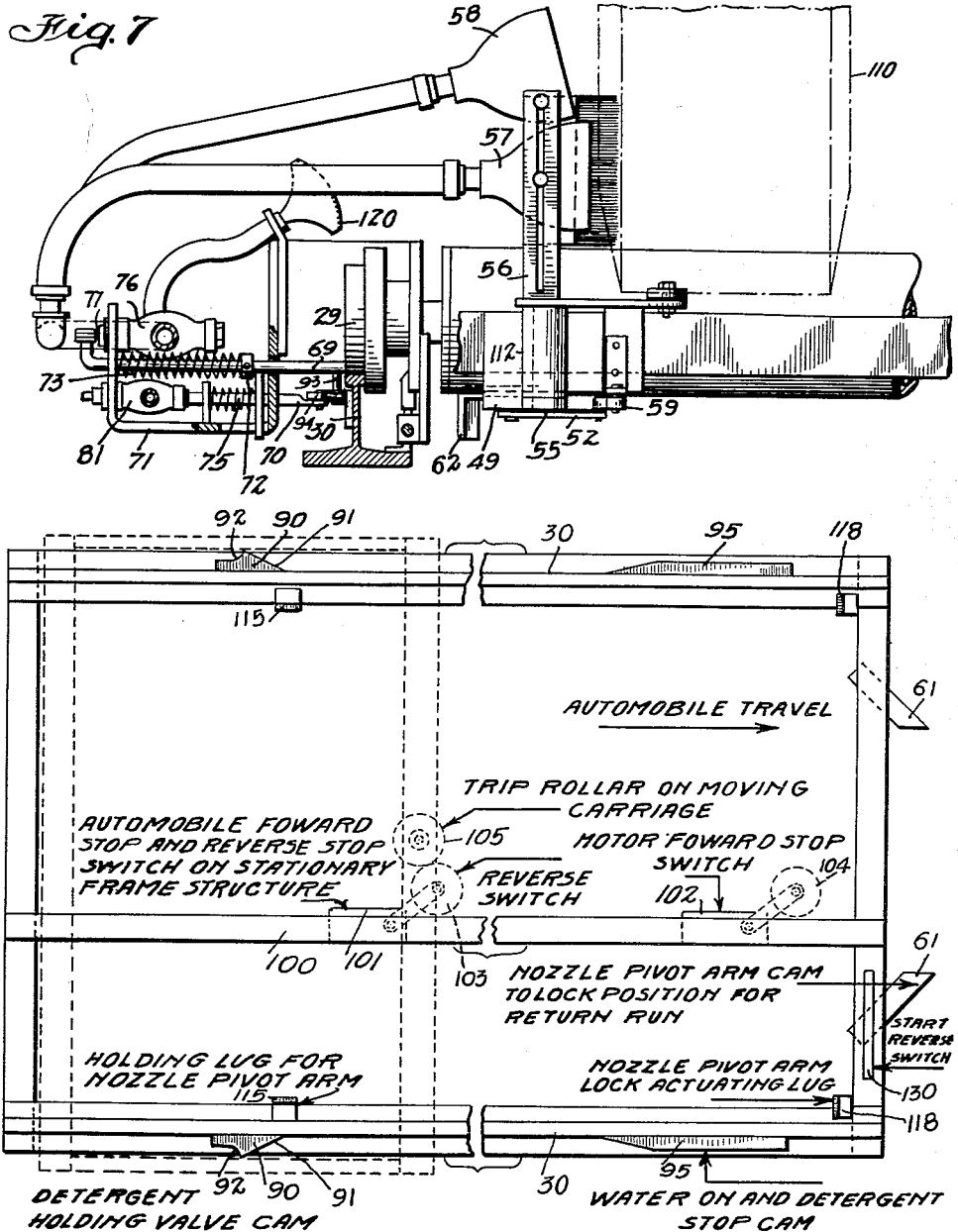

Oct. 25, 1960  B. F. ALMOND  2,957,195
AUTOMOBILE WHEEL WASHER
Filed Feb. 15, 1954  5 Sheets-Sheet 5
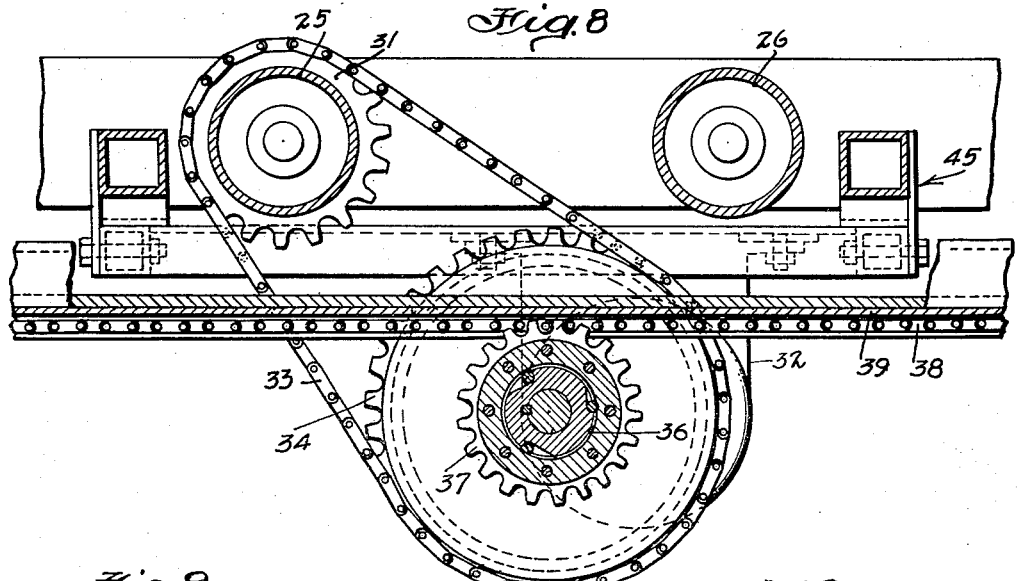
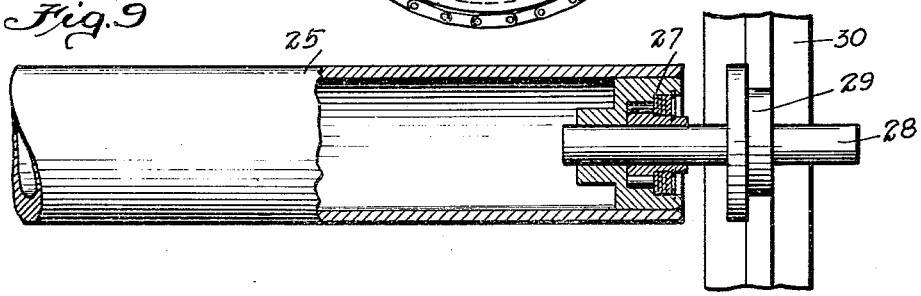
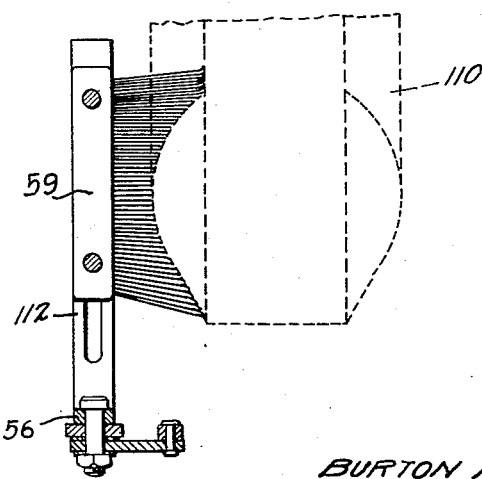
INVENTOR.
BURTON F. ALMOND
BY
ATTORNEYS

United States Patent Office 2,957,195
Patented Oct. 25, 1960

2,957,195

AUTOMOBILE WHEEL WASHER

Burton F. Almond, Inglewood, Calif.
(624 E. Evergreen St., Monrovia, Calif.)

Filed Feb. 15, 1954, Ser. No. 410,147

5 Claims. (Cl. 15—302)

This invention relates to a wheel washer and more particularly to a device designed for use in conjunction with automatic automobile washing machines for quickly, thoroughly and economically washing wheels of said automobiles during the passage of said automobiles through the automatic automobile washing machinery.

It is accordingly one purpose of this invention to provide means for automatically washing the wheels of automobiles while said automobiles are in transit through an automobile washing device.

It is a feature of this invention that the rate at which the wheels of said automobiles can be washed by the present invention is greatly increased over the rate of machines washed by mechanism heretofore used for this purpose.

It is a further feature of this invention that means are provided associated with the wheel washing mechanism for accommodating various size wheels and various width automobiles.

It is another feature of this invention that means are provided in conjunction with a wheel washing mechanism for automatically returning said wheel washing mechanism in position for succeeding wheels as a completely washed wheel is disengaged from the mechanism.

It is another feature of this invention that said return means is arranged to operate much faster than the original movement thereof, so as to condition the mechanism for receipt of a second, closely following wheel.

It is another feature of this invention that shock-absorbing means are arranged to cushion said rapid return movement.

The invention is characterized by the fact that steam and detergent are applied to the wheels of the vehicle as the vehicle travels through the wash rack, the steam and detergent applying means traveling with the vehicle and then returning to wash another wheel.

These and other features and advantages of the invention will be apparent from a detailed description in connection with the drawings, in which:

Figure 4 is a fragmentary plan view of another portion of the invention.

Figure 5 is a fragmentary plan view of another portion of the invention with the brush assembly in its active position.

Figure 6 is a section taken on the line 6—6 of Figure 4.

Figure 7 is a side view of the wheel washer proper.

Figure 8 is a section taken on the line 8—8 of Figure 2.

Figure 9 is a section taken on the line 9—9 of Figure 1.

Figure 10 is an enlarged side view showing the application of the brush to a wheel.

Figure 11 is a plan view of the control mechanism.

Figure 1:
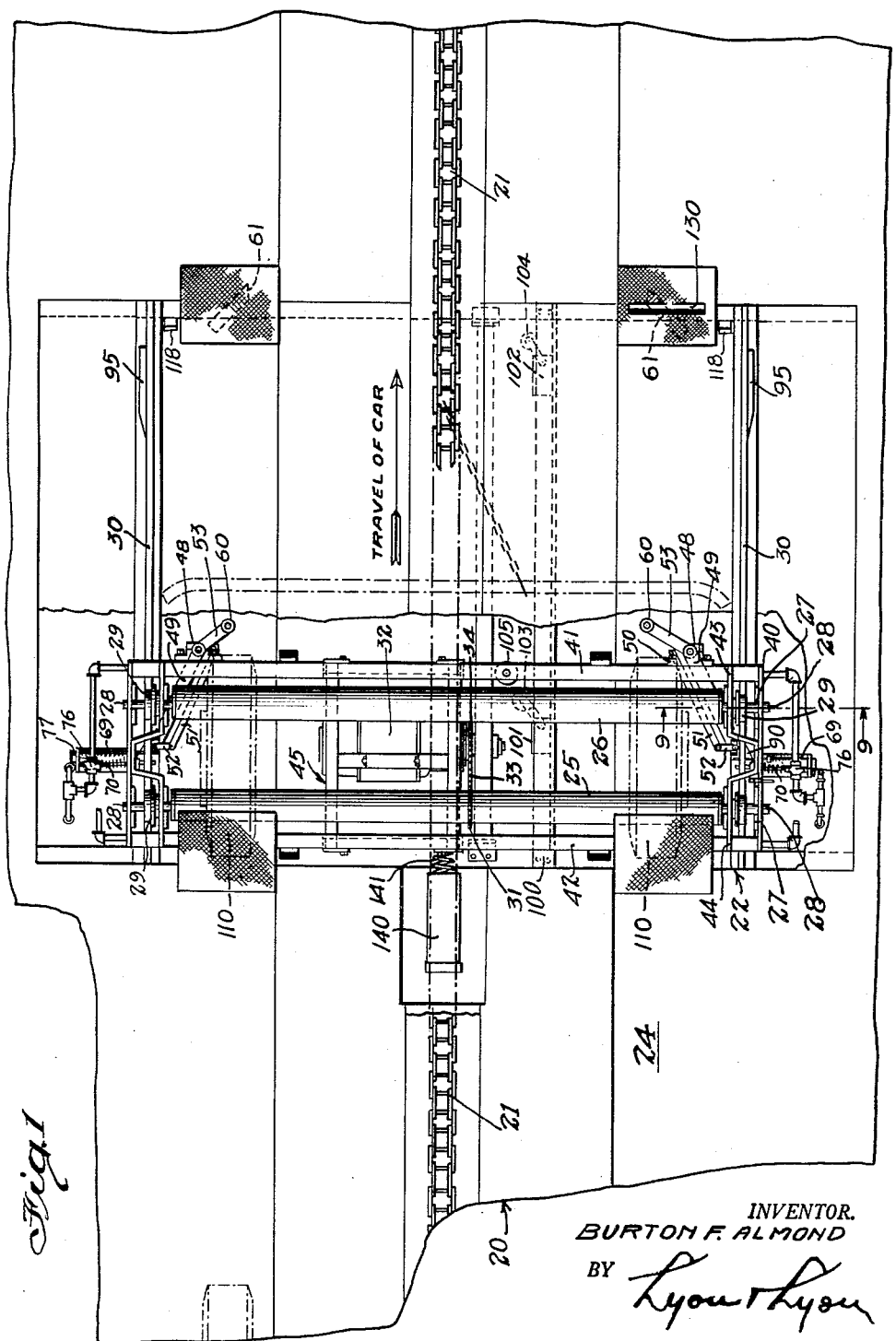
Figure 1 is a plan view of the device embodying the present invention.

Referring now more particularly to the drawings, there is shown an automobile wash rack indicated generally by the numeral 20 which is conventionally provided with a traveling chain 21 which is connected by suitable cable mechanism to a portion of the automobile to be washed to advance the automobile through the wash rack. Interposed in the path of the automobile is a wheel washing mechanism indicated generally by the numeral 22. The automobile traveling through the rack will travel with its wheel on a track 24 and, when arriving at the wheel washing mechanism 22, the wheel will travel over and be seated on a pair of rollers 25 and 26. The rollers 25 and 26 are mounted upon bearings 27 (see Figure 9) and shafts 28, which shafts 28 carry flanged wheels 29 mounted on tracks 30. The rollers 25 and 26 extend completely across the rack; and, while there will be described and is illustrated mechanism for washing the wheels of the right-hand side of the automobile, it will be appreciated that this mechanism is duplicated on the left-hand side for the washing of the left-hand wheels of the automobile.

Figure 2:
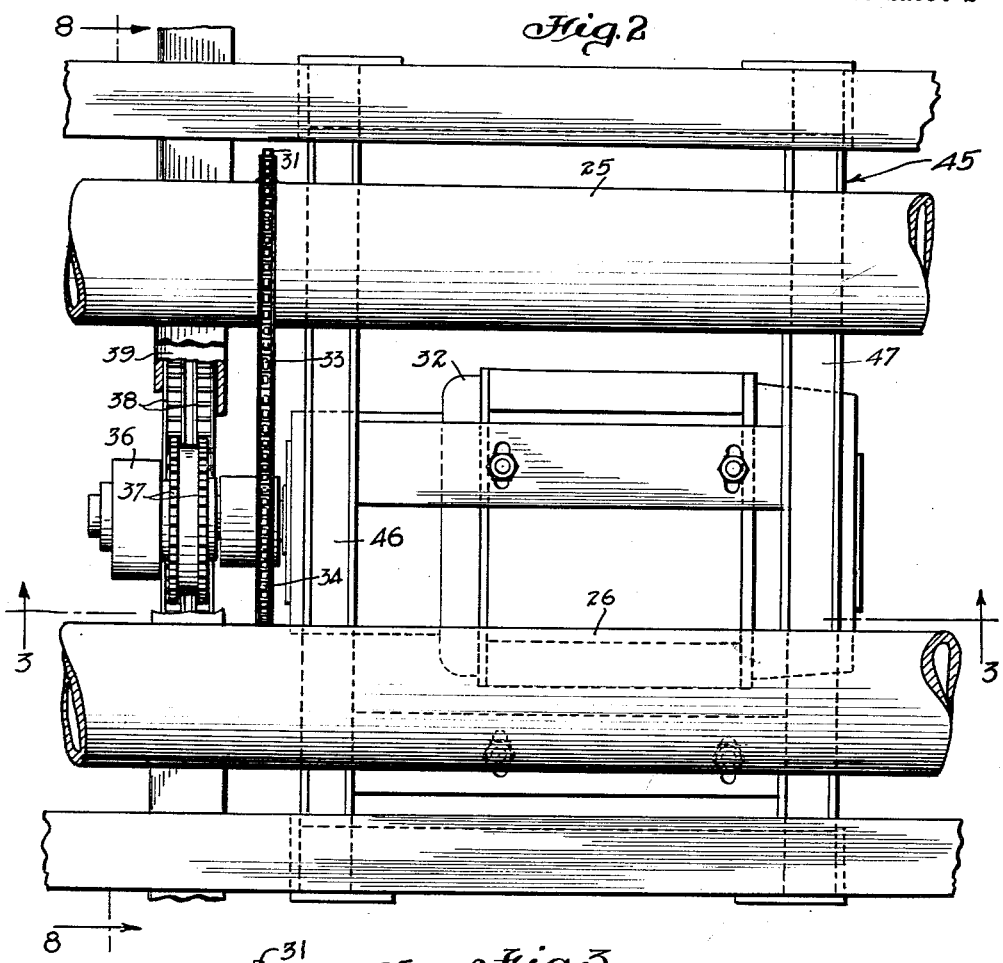
Figure 2 is an enlarged fragmentary plan view of a portion of the mechanism shown in Figure 1.
Figure 3:
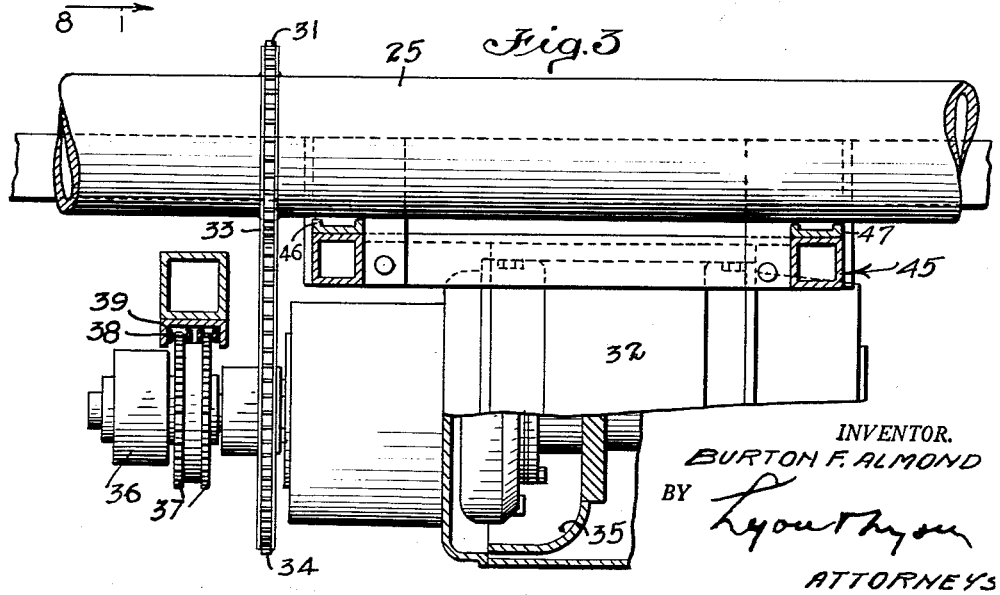
Figure 3 is a section taken along the line 3—3 of Figure 2.

Intermediate its ends the roller 25 is provided with a sprocket 31 preferably welded thereto, and an electromotor 32 (see Figure 2) drives a chain 33, which chain 33 passes over the sprocket 31 and a drive sprocket 34 mounted on the output shaft of the electromotor 32. The electromotor is provided with a fluid coupling 35 for shock-absorbing purposes. The output shaft of the electromotor 32 is also connected to a simple overriding clutch 36 for establishing connection between the output shaft of the motor and a double-row sprocket 37, which sprocket engages a double-row chain 38 mounted in a channel 39.

The wheel washing mechanism includes end plates 40 welded with cross beams 41 and 42 forming a rigid structure, and brackets 43 and 44 are provided which are welded with the cross beams 41 and 42 and in which the rollers 25 and 26 are journaled. Electromotor 32 is mounted on bracket 45 welded to beams 41 and 42 by means of channels 46 and 47. It will be appreciated from the foregoing description that, when the electromotor 32 is energized and the clutch 36 is engaged, the wheel washer, including all mechanism associated with the frame formed by the plates 40 and cross beams 41 and 42, will be caused to travel with the wheels 29 riding on the rails 30. This movement of the wheel washer, as driven by the electromotor 32 as hereinafter described, is utilized only for return of the wheel washer after the completion of the washing of an individual wheel in order to place the mechanism in position to receive a succeeding wheel.

Mounted on the cross beam 41 is a pivot block 48 in which is pivotally mounted an arm 49. Also pivotally mounted on a bracket 50 mounted adjacent the pivot block 48 is a parallel arm 51. A link 52 pivotally connects the ends of the arms 49 and 51 as shown. An arm 53 is welded to the arm 49 and pivots therewith. A coil spring 54 is connected at one end to the arm 49 and at the other end to a spring clip 55 mounted upon the beam 41. Thus, the spring 54 serves to constantly bias the arms 49 and 51 and associated mechanism in a clockwise direction as shown in Figure 5. It will be appreciated that the left-hand mechanism is a mirror image of the right-hand mechanism so that the left-hand mechanism would be constantly biased in a counterclockwise direction.

Mounted upon the link 52 by means of a pin 55 is a bracket 56 which serves as a support for nozzles 57 and 58 and brush 59. The bracket 56 is fixedly attached to the link 52. It will be appreciated that, by reason of the flexible parallelogram formed by the arms 49 and 51, link 52 and brackets 48 and 50, the attitude of the nozzles 57 and 58 and brush 59 with respect to an automobile wheel will remain fixed; that is, despite the pivoting of the parallelogram about the pivots of the brackets 48 and 50, the nozzles and brush remain oriented directly towards the automobile wheel 110 placed upon the rollers 25 and 26. The arm 53 carries a small roller 60 adapted to engage the cam plate 61 welded to the underside of the frame as indicated in Figure 1.

A locking clip 62 is welded to the arm 49. Mounted in a bracket 63 affixed to the underside of the bracket 43 is a sliding pin 64 movably journaled in end plates 65 and 66 of the bracket 63. The pin 64 is held against accidental displacement by a ball 67 and spring 68 and constantly urges the ball 67 into engagement with a groove in pin 64, as most clearly shown in Figure 6.

Referring now more particularly to Figures 5, 6 and 7, it will be noted that there is indicated a pair of shafts 69 and 70 mounted in the plate 40 and in a bracket 71 carried by the plate 40. The shaft 69 is provided with a collar 72 engaged by a coil spring 73. The shaft 70 is also mounted in the bracket 71 and is provided with a coil spring 75.

A steam valve 76 is provided mounted on the bracket 71, which valve is of the pin-actuated type and is provided with an actuating pin 77. An arm 78 is pivotally mounted adjacent the valve, and the end of the shaft 69 is curved over and engages a flattened end of the arm 78 as at 80. A second valve 81 is mounted in the bracket 71, which is a pin-actuated type valve the pin of which is extended to form the shaft 70.

Mounted upon the rail 30 is a cam 90 having a beveled surface 91 and a concave surface 92. A cam follower 93 is pivoted to the underside of the shaft 69, and a cam follower 94 is pivoted to the end of the shaft 70. A cam 95 is also provided affixed to the rail 30 adjacent one end thereof. Both of the cam followers 93 and 94 are adapted to engage the cam 95 for a purpose hereinafter described.

Mounted upon a beam 100 disposed to one side and longitudinally of the frame is a pair of limit switches 101 and 102 each actuated, respectively, by depressing of rollers 103 and 104 mounted to be contacted by a shoe 105 carried by the beam 41.

The operation of the above described device is as follows: Assuming the mechanism to be in position to receive a wheel 110 to be washed, the carriage will be in the extreme left-hand or starting position as shown in Figure 1. The parallelogram formed by the arms 49 and 51, link 52, etc., will be pivoted as shown in Figure 4 to the extreme left-hand position, i.e., counterclockwise. The upstanding member 112 of the bracket 56 will contact the shaft 69 and retain the same in depressed condition, thus holding the shaft 69 in position to shut off the supply of steam to the nozzle 58. The parallelogram remains locked in this position by reason of the fact that the locking clip 62 is locked behind dogging mechanism 115 carried by the rail 30. At the same time, the shoe 105 has engaged the roller 103 to open limit switch 101 thereby shutting off power to the electromotor 32. The mechanism is locked in this position by reason of the roller 93 carried by the shaft 69 being engaged in the concave surface 92 of the cam 90 and held therein by the bias in the spring 73. An automobile advancing onto the rollers 25 and 26 will cause a slight movement of the automobile washing mechanism away from the starting position and to the right as shown in Figure 1. As this happens, the shoe 105 disengages the roller 103 and permits the limit switch 101 to close, thus energizing the electromotor 32 and causing the roller 25 to be driven. The driving of the roller 25 will spin the wheel 110 forward. As the carriage is given this initial movement by the movement of the automobile onto the rollers 25 and 26, the locking clip 62 slips from behind the dogging mechanism 115 and the parallelogram is pivoted clockwise as shown in Figure 5 until the brush 59 and nozzles 57 and 58 are in contact with the wheel to be washed. The removal of the parallelogram as aforesaid has disengaged the member 112 from the end of the shaft 69, which shaft 69 carries the roller 93. The initial movement has also disengaged the roller 93 from the cam 90, thus permitting the shaft 69 to be moved under the bias of the spring 73 to open the valve 76 supplying steam to the nozzles 57 and 58.

While I have described the valve 76 as controlling a flow of steam to the mechanism, it will be realized that in practice the steam is mixed with and carries a detergent for thoroughly cleaning the vehicle wheels.

The vehicle progresses through the machine by being towed by the chain 21 and thus the wheel cleaning mechanism is caused to travel on the rails 30 to the right as shown in Figure 1 until the wheel cleaning device approaches the end of its travel. As the wheel cleaning device approaches the end of its travel, the roller 60 carried by the arm 53 engages the cam plates 61. Such engagement causes the parallelogram comprising the arms 49 and 51 and link 52 to be pivoted in a counterclockwise direction (see Figure 5) until the locking clip 62 is in position to be engaged by the sliding pin 64 which is pushed to the right by engagement with a stop 118 so as to override the locking clip 62 and thus retain the parallelogram in its retracted position.

Prior to this time, the roller 94 carried by the shaft 70 has engaged the cam 95 to open the valve 81 to permit a supply of rinsing water to be passed to the nozzle 120. At the same time, the roller 93 carried by the shaft 69 also engages the sloping wall of the cam 95 and shuts off the supply of steam to the nozzles 57 and 58. Thus, the supply of steam and detergent is interrupted and rinsing water is sprayed from the nozzle 120 during the last one and one-half revolutions of the wheel prior to the full travel of the wheel through the washing machine.

The arrival of the washing machine at the full length of its travel causes the shoe 105 to engage the roller 104 carried by the switch 102 to thus open the switch 102, thereby shutting off the supply of power to the motor 32 and stopping the rollers. After the arrival of the mechanism as aforesaid, the chain 21 continues to propel the vehicle, thus causing the wheel 110 to ride off the roller 26 and to engage a reverse start switch 130, thereby energizing the motor 32 in reverse and driving the washing machine mechanism back to its original starting position.

During the return of the washing machine mechanism, the parallelogram remains in its retracted position by reason of the fact that the sliding pin 64 engages the locking clip 62. As the mechanism thus travels towards its initial position, the roller 94 disengages the cam 95 and the water supply to the nozzle 120 is shut off. As the mechanism approaches its initial starting position, the dogging mechanism 115 engages the sliding pin 64 and unlocks the parallelogram. However, the parallelogram remains in the retracted position as it is then dogged by the dogging mechanism 115.

As the carriage thus approaches the initial position, the beam 41 engages a shock absorber 140 which is provided with a spring 141 adapted to absorb the shock of the returning mechanism. It will be noted that the return movement of the carriage under the force of electromotor 32 in practice is quite rapid in comparison to forward movement thereof, in order to have the carriage ready to receive a closely following wheel. The shock absorber 140 cushions this return movement. As the mechanism thus approaches the starting position, the roller 105 engages the roller 103 of the switch 102, which switch 102 serves not only as a forward starting switch but also as a reverse stop switch.

Simultaneously, the cam follower 93 carried by the shaft 69 engages the cam 90 locking in the concave surface 92 thereof. The shaft 69 being spring-biased by the spring 73, the roller 93 is thus held under tension in the concave surface 92, which prevents the washing mechanism from springing back after contact with the shock absorber 140. The device is now in condition to receive another automobile wheel and thus complete the cycle.

While there has been described what is at present considered to be the preferred embodiment of the present invention, it will be appreciated by those skilled in the art that various changes and modifications may be made therein without departing from the essense of the invention and it is intended to cover herein all such changes and modifications within the true spirit and scope of the appended claims. In particular, it will be obvious that hydraulic mechanism rather than mechanical or electrical can be utilized to actuate the carriage and this hydraulic mechanism may employ either oil, water or air.

I claim:

1. A vehicle wheel washing apparatus comprising: a rack, means for propelling a vehicle continuously along said rack, means for spraying steam and detergent on a wheel of said vehicle, said spraying means being arranged to travel with and to continue said spraying during a portion of the travel of said vehicle along said rack, said apparatus including a carriage, a pair of rails, wheels mounting said carriage on said rails for travel thereon, a pair of spaced rollers adapted to receive and support a vehicle wheel, means including said spaced rollers mounted on said carriage for revolving said wheel during travel of said carriage, said spraying means including a steam and detergent spray nozzle mounted on said carriage, said nozzle being mounted for movement toward and away from said vehicle wheel, and spring means constantly biasing said nozzle toward said wheel whereby said nozzle is adapted to be properly positioned to spray wheels of vehicles of varying wheel bases.

2. A vehicle wheel washing apparatus comprising: a rack, means for propelling a vehicle continuously along said rack, means for spraying steam and detergent on a wheel of said vehicle, said spraying means being arranged to travel with and to continue said spraying during a portion of the travel of said vehicle along said rack, said apparatus including a carriage, a pair of rails, wheels mounting said carriage on said rails for travel thereon, a pair of spaced rollers adapted to receive and support a vehicle wheel, means including said spaced rollers mounted on said carriage for revolving said wheel during travel of said carriage, said spraying means including a steam and detergent spray nozzle mounted on said carriage, an associated brush mounted on said carriage, said nozzle and brush being mounted for movement toward and away from said vehicle wheel, and spring means constantly biasing said brush toward said wheel whereby said brush is adapted to engage wheels of vehicles of varying wheel bases.

3. A vehicle wheel washing apparatus comprising: a rack, means for propelling a vehicle continuously along said rack, means for spraying steam and detergent on a wheel of said vehicle, said spraying means being arranged to travel with and to continue said spraying during a portion of the travel of said vehicle along said rack, said apparatus including a carriage, a pair of rails, wheels mounting said carriage on said rails for travel thereon, a pair of spaced rollers adapted to receive and support a vehicle wheel, means including said spaced rollers mounted on said carriage for revolving said wheel during travel of said carriage, means carried by said carriage and adapted to return said carriage to initial position after completion of said travel, and said carriage being propelled during initial travel by the vehicle propelling means.

4. A vehicle wheel washing apparatus comprising: a rack, means for propelling a vehicle continuously along said rack, means for spraying steam and detergent on a wheel of said vehicle, said spraying means being arranged to travel with and to continue said spraying during a portion of the travel of said vehicle along said rack, said apparatus including a carriage, a pair of rails, wheels mounting said carriage on said rails for travel thereon, a pair of spaced rollers adapted to receive and support a vehicle wheel, means including said spaced rollers mounted on said carriage for revolving said wheel during travel of said carriage, means carried by said carriage and adapted to return said carriage to initial position after completion of said travel, said carriage being propelled during initial travel by the vehicle propelling means, and shock absorbing means arranged to engage and to restrain said carriage on completion of its return movement.

5. A vehicle washing apparatus comprising: means for propelling a vehicle continuously through said apparatus, means for spraying steam and detergent on a wheel of said vehicle, said spraying means being arranged to travel with and to continue said spraying during a portion of the travel of said vehicle through said apparatus, said apparatus including a carriage, a pair of rails extending along the path of travel of said vehicle, wheels mounting said carriage on said rails for travel thereon, a pair of spaced rollers adapted to receive and support a vehicle wheel, means including said spaced rollers mounted on said carriage for revolving said wheel during travel of said carriage, means adapted to return said carriage to initial position after completion of said travel, and said carriage being propelled during initial travel by the vehicle propelling means.

References Cited in the file of this patent

UNITED STATES PATENTS

| | | |
|---|---|---|
| 1,412,732 | Young | Apr. 11, 1922 |
| 1,682,902 | Gibson | Sept. 4, 1928 |
| 1,740,014 | Hawkins | Dec. 17, 1929 |
| 1,931,444 | Mackin | Oct. 17, 1933 |
| 2,636,198 | Wilson | Apr. 28, 1953 |
| 2,692,214 | Hurst | Oct. 17, 1954 |
| 2,761,170 | Bonneau | Sept. 4, 1956 |